(12) United States Patent
Shin

(10) Patent No.: US 8,060,160 B2
(45) Date of Patent: Nov. 15, 2011

(54) MOBILE TERMINAL HAVING SPEAKER CONTROL AND METHOD OF USE

(75) Inventor: Min-Chul Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 1191 days.

(21) Appl. No.: 11/761,200

(22) Filed: Jun. 11, 2007

(65) Prior Publication Data

US 2007/0291961 A1    Dec. 20, 2007

(30) Foreign Application Priority Data

Jun. 15, 2006   (KR) .................. 10-2006-0054086

(51) Int. Cl.
*H04M 1/00* (2006.01)

(52) U.S. Cl. ................... 455/575.4; 379/433.02

(58) Field of Classification Search ............... 455/575.4, 455/575.1, 347, 90.3, 575.3
See application file for complete search history.

(56) References Cited

U.S. PATENT DOCUMENTS

| | | | | |
|---|---|---|---|---|
| 7,408,514 B2 * | 8/2008 | Go | ................................ | 343/702 |
| 7,499,735 B2 * | 3/2009 | Murata | ..................... | 455/575.1 |
| 7,809,414 B2 * | 10/2010 | Ohki et al. | ................. | 455/575.4 |
| 2004/0203996 A1 * | 10/2004 | Hansson | .................... | 455/550.1 |
| 2004/0235540 A1 | 11/2004 | Yajima | | |
| 2005/0130716 A1 | 6/2005 | Shin | | |
| 2006/0025184 A1 | 2/2006 | Cho et al. | | |
| 2006/0030381 A1 | 2/2006 | Byun et al. | | |

FOREIGN PATENT DOCUMENTS

| | | |
|---|---|---|
| CN | 1728928 | 2/2006 |
| EP | 1 124 175 A2 | 8/2001 |
| EP | 1 473 910 A | 11/2004 |
| EP | 1 549 028 A | 6/2005 |
| JP | 2000-049920 | 2/2000 |
| JP | 2005-033723 | 2/2005 |
| JP | 2005-229318 | 8/2005 |
| JP | 2006-019910 | 1/2006 |
| JP | 2006-019925 | 1/2006 |
| JP | 2006-067386 | 3/2006 |
| WO | WO 2006-038499 A | 4/2006 |

* cited by examiner

*Primary Examiner* — Tu X Nguyen
(74) *Attorney, Agent, or Firm* — Lee, Hong, Degerman, Kang & Waimey

(57) ABSTRACT

An apparatus and method for speaker control in a mobile terminal is provided. The mobile terminal includes a first body having first and second key input units, and a second body having a display unit and swingably connected in at least one of a clockwise and counterclockwise rotation, such that the display can be positioned in a vertical direction in a closed state and in a horizontal direction in an open state, and at least two sound emission holes are formed on an upper surface of the second body for outputting sounds from at least two speakers, based on the open and closed state.

17 Claims, 10 Drawing Sheets

MOBILE TERMINAL HAVING SPEAKER CONTROL AND METHOD OF USE

CROSS-REFERENCE TO RELATED APPLICATIONS

Pursuant to 35 U.S.C. §119 (a), this application claims the benefit of earlier filing date and right of priority to Korean Application No. 10-2006-0054086, filed on Jun. 15, 2006, the consents of which is hereby incorporated by reference herein in its entirety.

The present invention is directed to a swing type mobile terminal and, more particularly, to a mobile terminal convenient for call communication use with its body swung open in a horizontal direction.

DISCUSSION OF THE RELATED ART

FIG. 1 is a front view of a related art mobile terminal 100 and FIG. 2 is a front view of the related art mobile terminal 100 with one body swung open.

As illustrated in FIGS. 1 and 2, the related art swing type mobile terminal includes a first body 102 having key buttons 106 that allow inputting information, and a second body 104 which is swingably connected with the first body 102 and includes a display 108.

A microphone 112 that inputs sound for call communication is mounted at one end of the first body 102, and a speaker 110 that outputs sounds during call communication is mounted at one end of the second body 104 in a vertical position.

The related art mobile terminal 100 has a problem because the speaker 110 is positioned vertically at the upper end of the second body 104 and when the second body 104 is swung in the horizontal direction, the speaker 110 is positioned at the side in the horizontal direction, making it difficult for a user to perform call communication.

Specifically, if the second body 104 is swung open in the horizontal direction, the second body 104 should be swung back to the vertical position in order to perform call communication, therein causing user inconvenience.

In addition, because the related art mobile terminal 100 uses the single speaker 110, it cannot reproduce a surround sound when reproducing multimedia.

SUMMARY OF THE INVENTION

One aspect of the present invention includes a mobile terminal having speaker control, the mobile terminal including a first body having a first key input unit and a second key input unit, a second body swingably connected to the first body and having a display unit positioned in one of a vertical direction in a closed state and a horizontal direction in an open state, wherein at least two sound emission holes are formed on the second body.

It is contemplated that the second body further comprises at least two speakers for outputting sound emitted through the at least two sound emission holes. It is further contemplated that a first speaker positioned at an upper end of the display unit that is operated when the display is in the closed state, and a second speaker positioned at one side of the display unit that is operated when the display is in the open state.

It is contemplated that the first speaker is mounted at a rear side of a first sound emission hole formed at the upper end of the display unit and the second speaker is mounted at a corner portion of the display unit. It is further contemplated that the second body further comprises a sound guiding part guiding sound generated from the second speaker to a second sound emission hole.

It is contemplated that the sound guiding part includes a sound path formed at an inner surface of the second body; and a sealing member hermetically sealing the sound path to prevent leakage of sound passing through the sound path. It is further contemplated that the sound path is formed at an edge of the inner surface of an upper case of the second body.

It is contemplated that the sound path comprises a display support rib for supporting the display unit, and a space formed between the support rib and a separation wall extending from the edge of the upper case of the second body. It is further contemplated that the second body further includes a mounting part allowing the second speaker to be mounted on the corner portion.

It is contemplated that the sound guiding part is formed as a combination of a first rib protruding from an inner surface of the upper case of the second body and a second rib protruding from an inner surface of a lower case of the second body. It is contemplated that when in the closed state, an entire bottom surface of the second body is in parallel contact with an upper surface of the first body, and when in the open state, a portion of the bottom surface of the second body is in perpendicular contact with the upper surface of the first body. It is further contemplated that the second body further includes a single speaker, and a sound guiding part guiding sound generated from the single speaker to the at least two sound emission holes.

Another aspect of the present invention includes a mobile terminal having speaker control, including a display unit displaying an image in one of a vertical and horizontal orientation; a first speaker unit mounted on an upper end portion of the display unit; a second speaker unit mounted on at least one side of the display unit; and a controller outputting sounds through the first speaker unit when the image is displayed in the vertical orientation, and outputting sounds through the second speaker unit when the image is displayed in the horizontal orientation.

It is contemplated that the second speaker unit comprises at least two speakers mounted at opposing side portions of the display unit. It is further contemplated that when the image is displayed in the horizontal orientation on the display unit, the controller outputs surround sound via the at least two speakers.

It is contemplated that when reproducing multimedia data is requested, the controller outputs surround sound via the first speaker unit and second speaker unit. It is further contemplated that when the image is displayed in the horizontal orientation on the display unit, the controller outputs a main sound via the first speaker unit and a base sound via the second speaker unit.

In another aspect of the present invention, a speaker control method in a mobile terminal includes the steps of detecting whether an image is displayed in one of a horizontal and vertical orientation on a display unit; outputting a sound via a first speaker when a call connection is attempted upon detecting that an image is displayed in the vertical orientation on the display unit; and outputting the sound via a second speaker if a call connection is attempted upon detecting that an image is displayed in the horizontal orientation on the display unit.

It is contemplated that the method further includes outputting sound via the first speaker and the second speaker when reproducing of multimedia data is requested, wherein the multimedia data is displayed in one of the vertical and horizontal orientation on the display unit. It is further contemplated that the method further includes outputting a main sound via the first speaker and a base sound via the second speaker when the image is displayed in the horizontal orientation and reproducing of multimedia data is requested.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.
In the drawings.

DETAILED DESCRIPTION OF THE INVENTION

A mobile terminal according to embodiments of the present invention will now be described with reference to the accompanying drawings.

Figure 1:
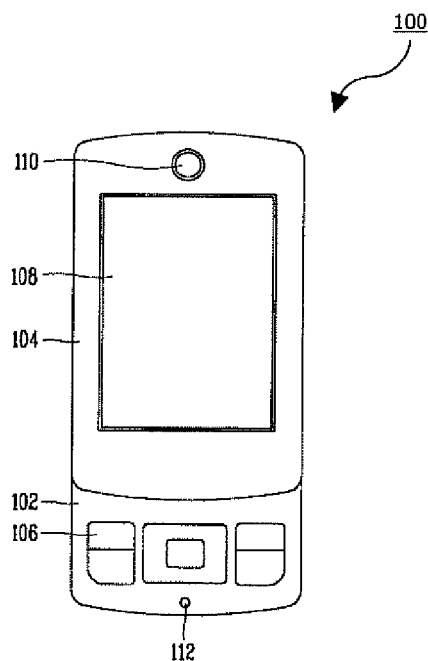
FIG. 1 is a front view illustrating a mobile terminal according to the related art.
Figure 2:
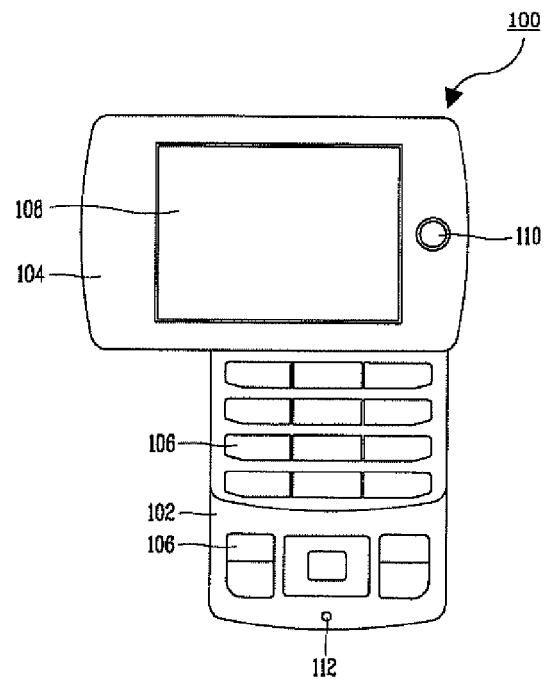
FIG. 2 illustrates the mobile terminal of FIG. 1 with the second body swung open horizontally.
Figure 3:
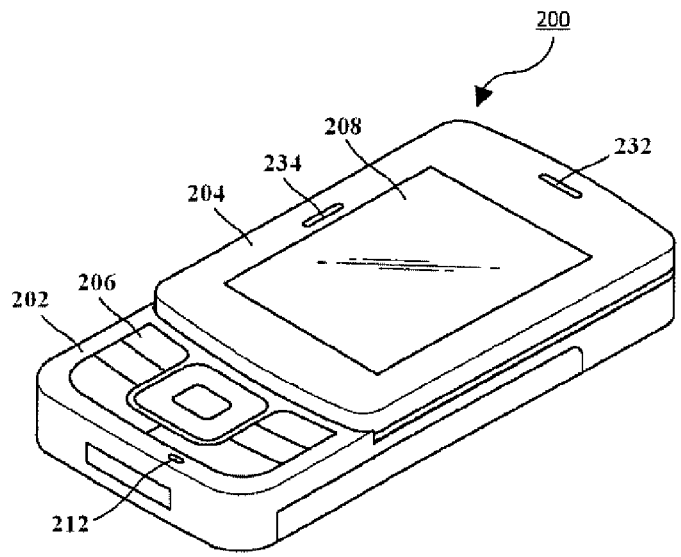
FIG. 3 is a perspective view of a mobile terminal according to a first embodiment of the present invention.
Figure 4:
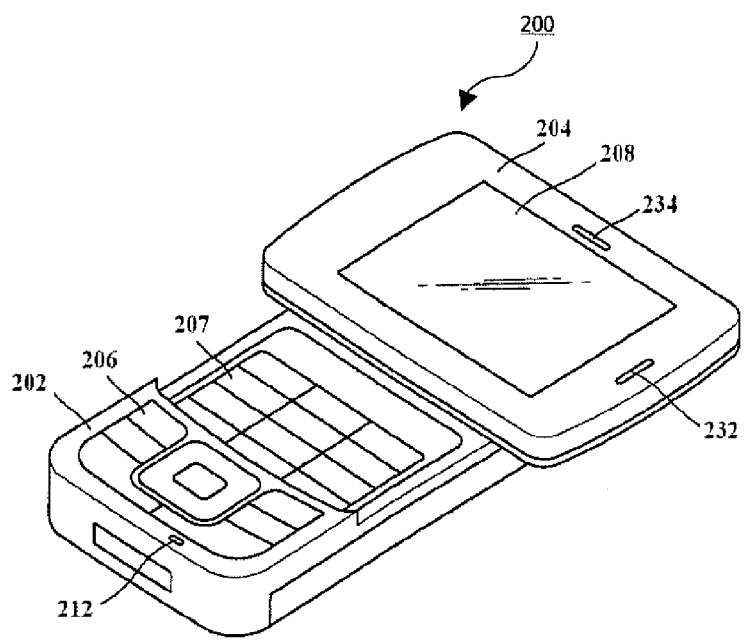
FIG. 4 is a perspective view of the mobile terminal with an upper body swung open according to the first embodiment of the present invention.

FIG. 3 is a perspective view of a mobile terminal 200 according to a first embodiment of the present invention, and FIG. 4 is a perspective view of the mobile terminal with an upper body swung open.

As illustrated in FIGS. 3 and 4, the mobile terminal 200 includes a first body 202 including keys 206, 207 for inputting information, and a second body 204 having a display 208. The second body 204 contacts an upper surface of the first body 202 and may be swingably rotated clockwise or counterclockwise such that the display 208 is positioned in a vertical direction in a closed state and in a horizontal direction in an open state.

A swing module (not shown) is installed between the first and second bodies 202 and 204 and supports the second body such that the second body contacts an upper surface of the first body and is swung clockwise or counterclockwise.

According to a position of the swing module, in the closed state as illustrated in FIG. 3, an entire bottom surface of the second body 204 can be in parallel contact with the upper surface of the first body 202, and a left or right portion of the bottom surface of the second body can be in parallel contact with the upper surface of the first body in an open state, as illustrated in FIG. 4. Alternatively, in the closed state illustrated in FIG. 3, according to the position of the swing module, the entire bottom surface of the second body 204 can be in parallel contact with the upper surface of the first body 202, and a central portion of the bottom surface of the second body can be in parallel contact with the upper surface of the first body in the open state as illustrated in FIG. 4.

The first body 202 includes the first keys 206 disposed on the upper surface and exposed always regardless of a swung position of the second body 204. The first body 202 also includes second keys 207 which are exposed only when the second body 204 is swung open in the horizontal direction and allows inputting of information.

A microphone 212 is installed on the first body 202 in order to input sounds in a call mode.

The second body 204 includes at least two sound emission holes 232, 234 formed at an upper end portion and on one side of the display 208 of the upper surface, based on the closed state. In detail, the second body 204 includes the first sound emission hole 232 positioned at the upper end portion of the display 208, based on the closed state, and the second sound emission hole 234 which is positioned at one side of the display based on the closed state and is positioned at an upper portion in the open state. In this case, a third sound emission hole (not shown) can be additionally formed at the other side of the display 208.

According to the first embodiment of the present invention, the second body 204 may include at least two speakers 210, 211 for outputting sounds emitted through the sound emission holes 232, 234.

In this embodiment, the first speaker 210 can be mounted at the rear side of the first sound emission hole 232, and the second speaker 211 can be mounted at a rear side of the second sound emission hole 234. In this case, when a third sound emission hole (not shown) is additionally formed at the other side of the display 208, a third speaker (not shown) can be mounted at the rear side thereof.

Figure 5:
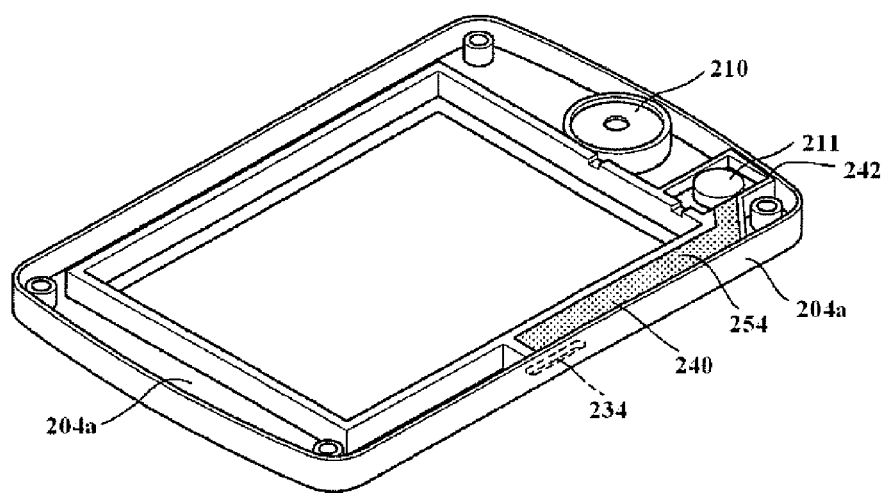
FIG. 5 is a perspective view illustrating an inner surface of an upper case of a second body of the mobile terminal according to the first embodiment of the present invention.

Regarding the two speakers, the first speaker 210 is mounted at the rear side of the sound emission hole 232 formed at an upper end portion of the display 208, while the second speaker 211 can be mounted at a corner portion of the display as illustrated in FIG. 5. For this purpose, the second body 204 may include a sound guiding part 240 that guides sounds generated from the second speaker to the sound emission hole 234 formed at one side of the display unit 208, in order to overcome a spatial restriction. This will be described with reference to FIGS. 5 to 9.

Figure 6:
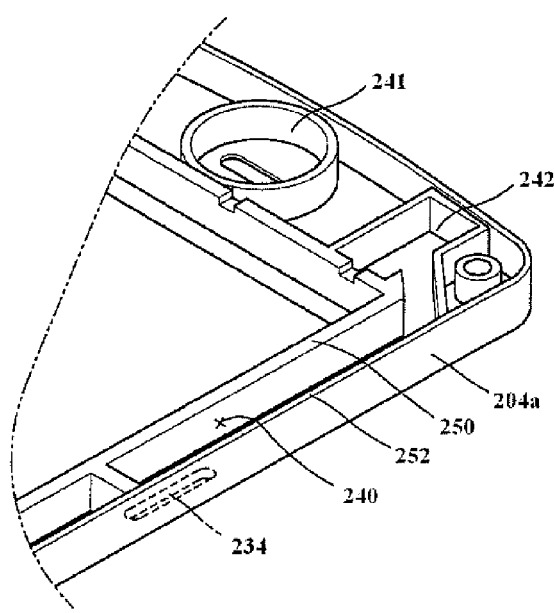
FIG. 6 is a partial perspective view illustrating the inner surface of the upper case of the second body of the mobile terminal according to the first embodiment of the present invention.
Figure 7:
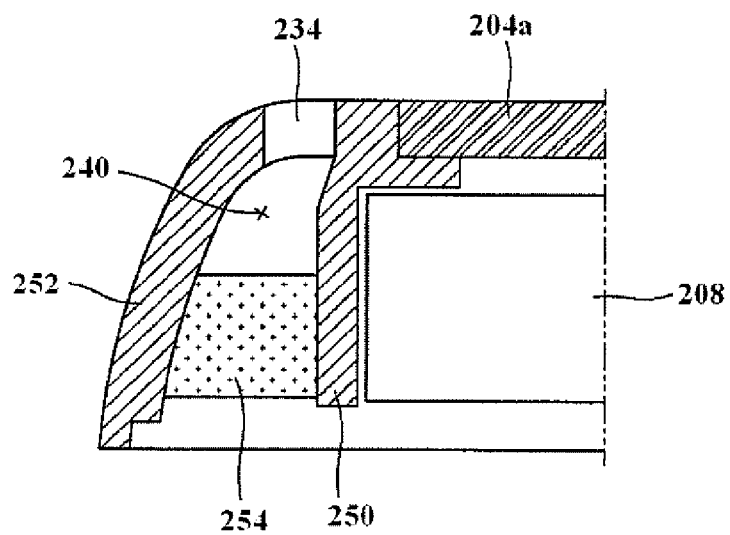
FIG. 7 is a partial sectional view of the upper case of the second body of the mobile terminal according to the first embodiment of the present invention.
Figure 8:
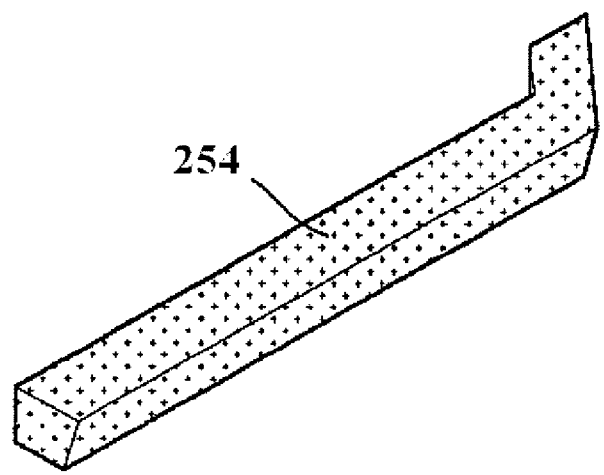
FIG. 8 illustrates a sealing member of the mobile terminal according to the first embodiment of the present invention.
Figure 9:
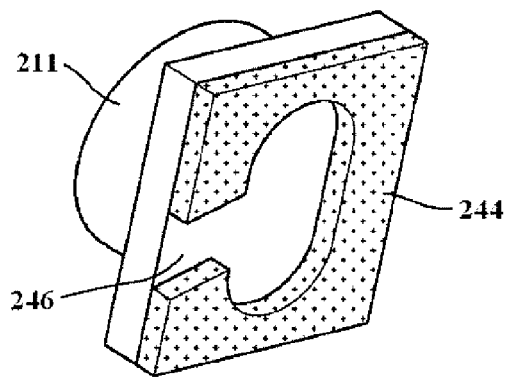
FIG. 9 is a perspective view of the second speaker of the mobile terminal according to the first embodiment of the present invention.

FIG. 5 is a perspective view illustrating an inner surface of an upper case 204a of the second body 204 of the mobile terminal 200 according to the first embodiment of the present invention. FIG. 6 is a partial perspective view illustrating the inner surface of the upper case 204a of the second body 204 of the mobile terminal 200 according to the first embodiment of the present invention. FIG. 7 is a partial sectional view of the upper case 204a of the second body 204 of the mobile terminal 200 according to the first embodiment of the present invention. FIG. 8 is a perspective view of a sealing member of the mobile terminal 200 according to the first embodiment of the present invention. FIG. 9 is a perspective view of the second speaker 211 of the mobile terminal 200 according to the first embodiment of the present invention.

As illustrated in FIGS. 5 and 6, the second body 204 includes at least two speakers 210, 211 that outputs sounds emitted through the sound emission holes 232, 234.

The first speaker 210 can be mounted at the first mounting part 241 formed at the vertical upper end portion of the upper case 204a, namely, at the rear side of the first sound emission hole 232.

The second speaker 211 can be mounted at a second mounting part 242 formed at the corner portion of the display 208 at a certain interval from the first speaker 210, to thus overcome a spatial restriction.

The second body 204 further includes a sound guiding part 240 that guides the sound generated from the second speaker 211 to the second sound emission hole 234.

The sound guiding part 240 is formed in a lengthwise direction at an inner side of the upper case 240a of the second body 204. One end of the sound guiding part 240 is connected with the second speaker mounting part 242 on which the second speaker 211 is mounted and the other end thereof is connected with the second sound emission hole 234.

The sound guiding part 240 includes a support rib 250 formed at the inner side of the second body 204 and supporting the display 208, and a space defined by a separation wall 252 extending from an edge of the upper case 204a of the second body.

As illustrated in FIGS. 5 and 7, a sealing member 254 for preventing a leakage of sounds through the sound guiding part 240 is mounted in the sound guiding part 240.

As illustrated in FIGS. 7 and 8, the sealing member 254 is formed as a bar with a certain length configured to be inserted in the guide part 240. One side of the sealing member 254 is tightly attached at the separation wall 252 and the other side of the sealing member is tightly attached at the support rib 250 to close the guide part 240. The sealing member 254 is preferably made of a urethane material, but those skilled in the art will appreciate that other suitable materials may be used as well.

As illustrated in FIG. 9, a damper member 244 is inserted in the second speaker mounting part 242 to prevent a leakage of the sound generated from the second speaker 211 and to protect the second speaker from an impact.

The damper member 244 is preferably made of a urethane material and includes a path 246 connected with the guide part 240, but those skilled in the art will appreciate that other suitable materials may be used as well.

Figure 10:
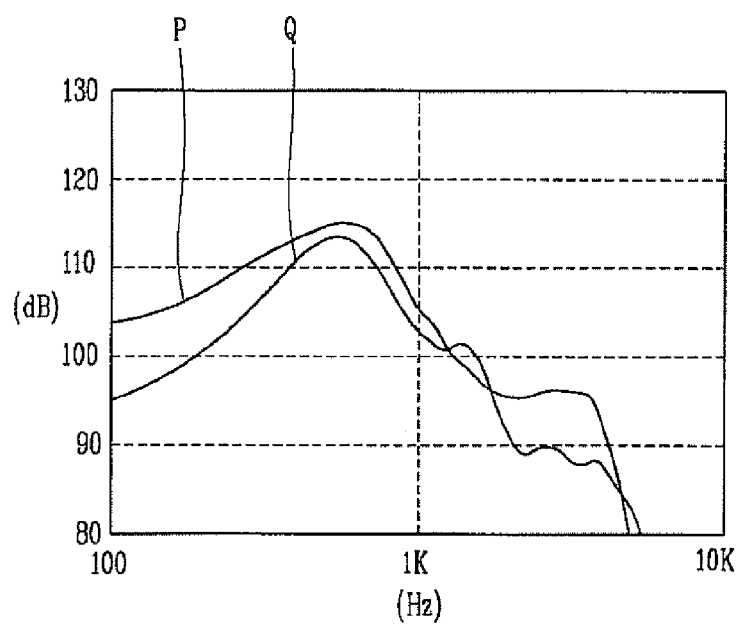
FIG. 10 is a graph illustrating a sound volume emitted through a speaker of the mobile terminal according to the first embodiment of the present invention.

FIG. 10 is a graph illustrating a comparison between a sound volume emitted through the first sound emission hole 232 and through the second emission hole 234 according to the first embodiment of the present invention.

As illustrated in FIG. 10, in comparing the graph (P) illustrating a sound volume emitted directly through the first sound emission hole 232 upon being generated from the first speaker 210 and the graph (Q) illustrating a sound volume emitted through the second sound emission hole 234 after passing through the sound guiding part 240 upon being generated from the second speaker 211, it is noted that the sound volume emitted through the second sound emission hole exerts performance of about 80 percent of that emitted through the first sound emission hole. Namely, because there is little loss while the sound passes through the sound guiding part 240, the sound emitted through the second emission hole 234 is adequate for a communication mode.

In summary, in the first embodiment of the present invention, the second body 204 includes at least two speakers 210, 211 to allow smooth call communication when the second body is swung in a horizontal direction. In order to overcome the spatial restriction, the first speaker 210 is positioned at the upper side of the display 208 and the second speaker 211 is positioned at the corner portion of the display.

A mobile terminal 300 according to the second embodiment of the present invention will now be described. According to the second embodiment of the present invention, the second body 304 includes a speaker 310 (see FIG. 11) mounted at the rear side of the first sound emission hole 332, and a sound guiding part 340 for guiding the sound output from the speaker to the second sound emission hole 334. This will be described in detail with reference to FIGS. 10 and 11.

Figure 11:
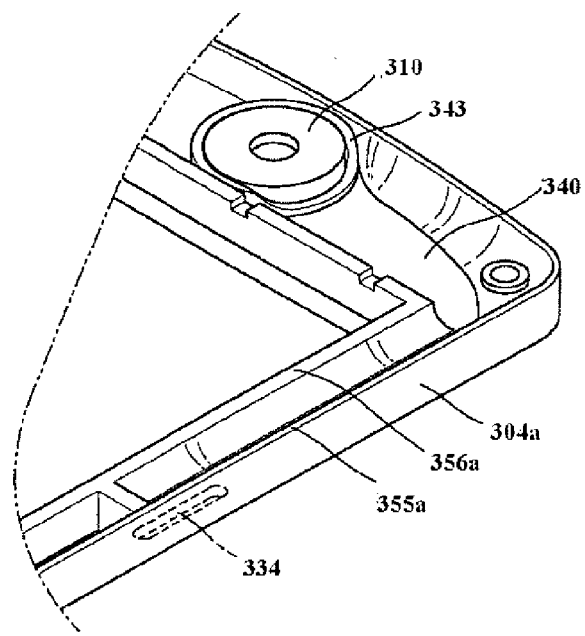
FIG. 11 is a partial perspective view illustrating an inner surface of an upper case of a second body of the mobile terminal according to a second embodiment of the present invention.
Figure 12:
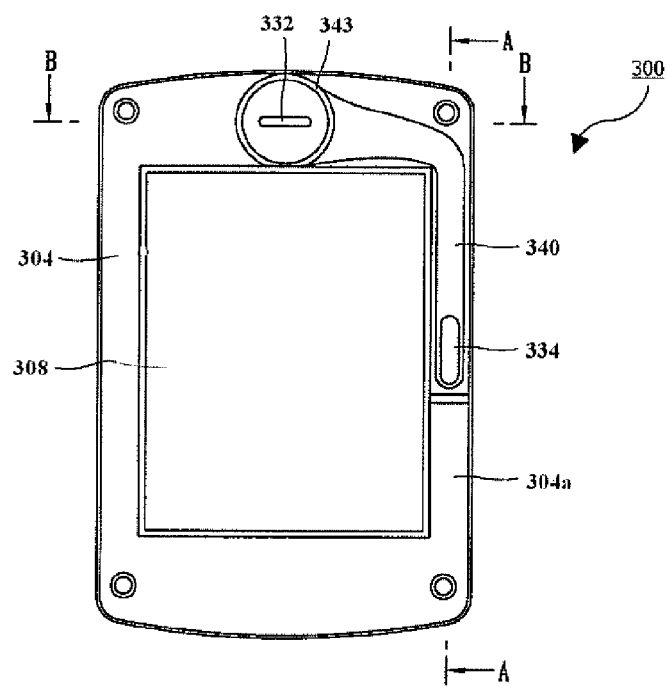
FIG. 12 is a front view illustrating the inner surface of the upper case of the second body of the mobile terminal according to the second embodiment of the present invention.
Figure 13:
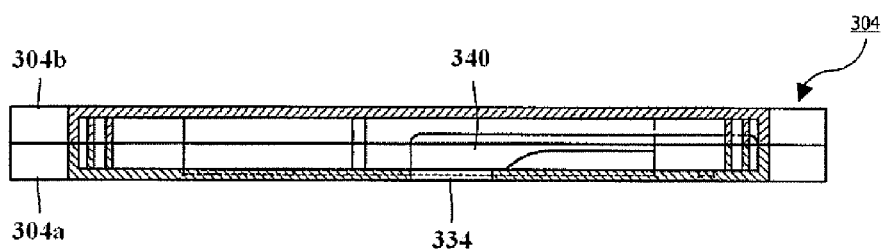
FIG. 13 is a sectional view taken along line A-A in FIG. 12.
Figure 14:
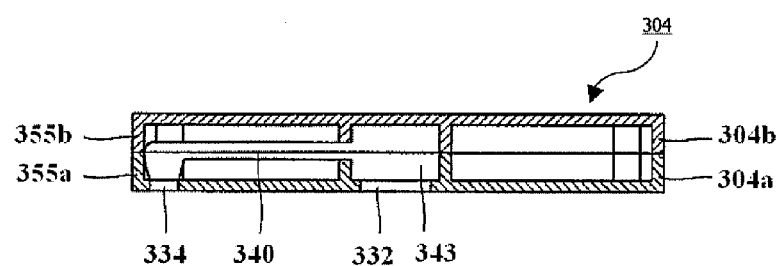
FIG. 14 is a sectional view taken along line B-B in FIG. 12.

FIG. 11 is a partial perspective view illustrating an inner surface of an upper case 304a of a second body 304 of the mobile terminal 300 according to the second embodiment of the present invention. FIG. 12 is a front view illustrating the inner surface of the upper case 304a of the second body 304 of the mobile terminal 300 according to the second embodiment of the present invention. FIG. 13 is a sectional view taken along line A-A in FIG. 12. FIG. 14 is a sectional view taken along line B-B in FIG. 12.

As illustrated in FIGS. 11 to 14, according to the second embodiment of the present invention, a single speaker 310 is used to reduce fabrication unit cost. In order to output sounds through the both first and second sound emission holes 332 and 334, a sound guiding part 340 is provided to guide the sound emitted from the speaker 310 to the second sound emission hole.

In detail, the second body 304 may include a speaker 310 mounted at the rear side of the first sound emission hole 332 and outputting sounds and a sound guiding part 340 that guides the sound output from the speaker to the second sound emission hole 334.

The speaker 310 is mounted on a mounting part 343 extending and protruded in a cylindrical shape with a certain thickness and height on the inner surface of the upper case 304a constituting the second body 304. In this embodiment, the mounting part 343 includes a path connected with the sound guiding part 340.

The sound guiding part 340 can be formed to be bent along an edge of the display 308.

The sound guiding part 340 includes a separation wall 355a extending from an edge of the upper case 304a of the second body 304 and a space between the separation wall and a support rib 356a formed at an inner side of the second body that supports the display 308.

The sound guiding part 340 is formed in a curved line shape with a certain length and an irregular sectional area. Namely, the sound guiding part 340 has a sectional area with an inner diameter narrower than a sectional area of both the speaker 310 and the second sound emission hole 334. The sound guiding part 340 is configured to overcome the spatial restriction of the mobile terminal 300.

The sound guiding part 340 can be formed when the separation wall 355a protruded from the inner surface of the upper case 304a, the support rib 356a that forms the second body 304, an isolation wall 355b protruded from the inner surface of the lower case 304b and a support rib 356b that forms the second body are combined. In this case, a sealing member (not shown) may be provided to the combined portions in order to prevent a leakage of sound waves.

In summary, in the second embodiment of the present invention, in order to reduce the fabrication unit cost, the speaker 310 is mounted only at the rear side of the first sound emission hole 332, and the sound emitted from the speaker is output to the second sound emission hole 334 through the sound guiding part 340.

Figure 15:
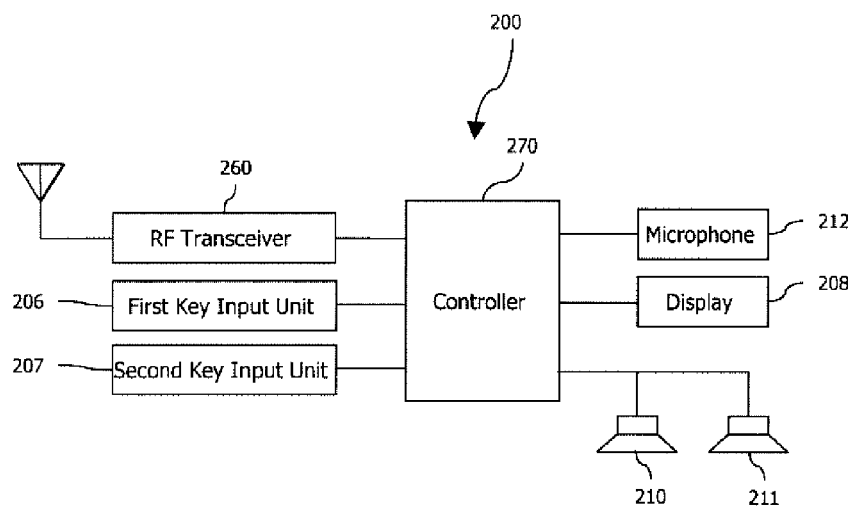
FIG. 15 is a schematic block diagram illustrating a mobile terminal according to the first embodiment of the present invention.
Figure 16:
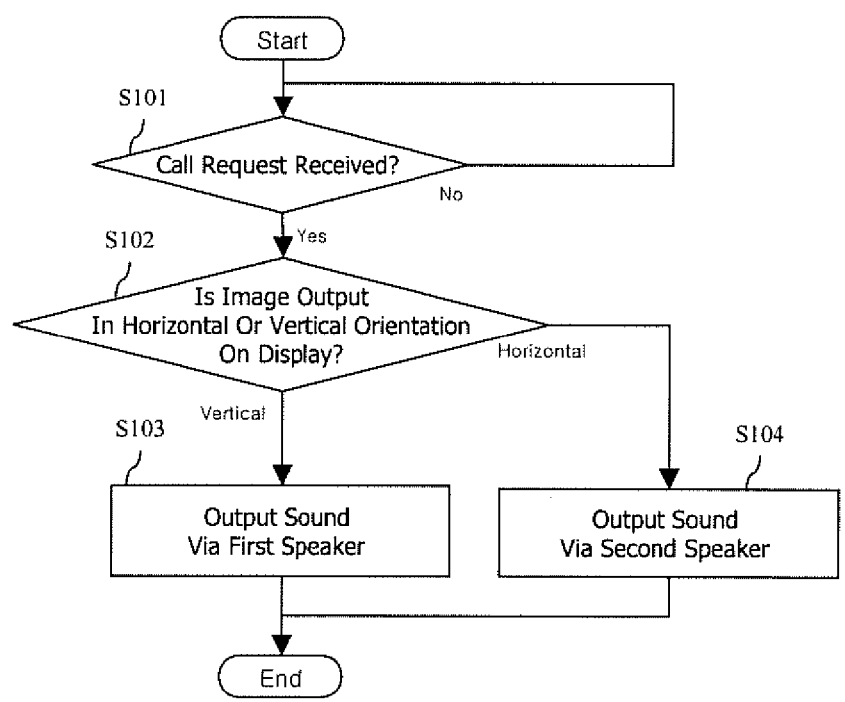
FIG. 16 is a flow chart illustrating a first speaker control method according to the first embodiment of the present invention.
Figure 17:
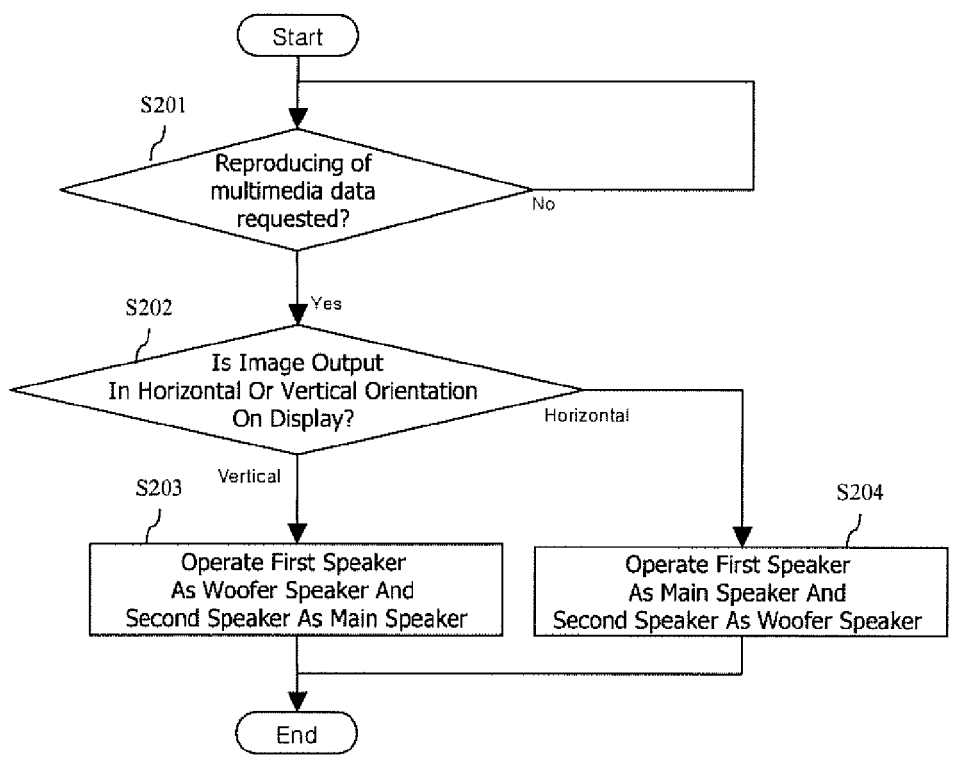
FIG. 17 is a flow chart illustrating a second speaker control method according to the first embodiment of the present invention.

FIG. 15 is a schematic block diagram illustrating a mobile terminal 200 according to the first embodiment of the present invention. FIG. 16 is a flow chart illustrating a first speaker control method according to the first embodiment of the present invention. FIG. 17 is a flow chart illustrating a second speaker control method according to the first embodiment of the present invention.

As illustrated in FIG. 15l the mobile terminal 200 having the exterior appearance as shown in FIGS. 3 and 4, includes an RF transceiver 26, the first key input unit 206 and the second key input unit 207, the microphone 202, the display 208, at least two speakers 210 and 211, and a controller 270.

The RF transceiver 260 is electrically connected with the controller 270 and may include electronic components for transmission and reception of radio waves. The RF transceiver 260 may include electronic components that support communication according to CDMA, GSM, GPRS, TDMA, IMT-2000, WCDMA, HASDPA, IEEE 802.11, IEEE 802.16, but is not limited thereto. Electrically connected with the controller 270, the RF transceiver 260 performs communication under the control of the controller.

The first key input unit 206 is electrically connected with the controller 270, and in order to receive an input from a user, as shown in FIG. 3, the first key input unit is exposed, while the second key input unit 207 is disposed on an inner surface of the first body 202 and is exposed only when the second body 204 is open as illustrated in FIG. 4.

The microphone 212 is electrically connected with the controller 270 and is disposed at a lower end portion of the first body 202 as shown in FIG. 3, in order to receive an input of sounds from the user.

The display 208 can be formed of a liquid crystal display (LCD) or an organic light emitting diode (OLED). The display 208 is electrically connected with the controller 270 and displays screen images according to several functions of the mobile terminal 200.

The at least two speakers 210 and 211 can output sounds generated according to various functions of the mobile terminal 200. As mentioned above, the first speaker 210 can be mounted on the rear side of the first sound emission hole 232 while the second speaker 211 can be mounted on the rear side of the second sound emission hole 234 formed at one side of the display 208. Furthermore, as mentioned above, when the third sound emission hole (not shown) is additionally formed at the other side of the display 208, a third speaker (not shown) can be mounted on the corresponding rear side.

The speakers 210 and 211 are electrically connected with the controller 270 and controlled as described below.

The controller 270 includes a plurality of semiconductor devices and is electrically connected with the RF transceiver 260, the key input units 206 and 207, the microphone 212, the display 208, and the first and second speakers 210 and 211, in order to provide control functions.

With reference to the flow chart illustrated in FIG. 16, when a call request is received (step S101), the controller 270 detects whether an image is shown in the horizontal or vertical orientation on the display 208 (step S102). When the image is shown in the vertical orientation on the display 208, the controller 270 operates the first speaker 210 (step S103). If the image is horizontally displayed on the display 208, the controller 270 operates the second speaker 211 (step S104).

In the flow chart illustrated in FIG. 17, when a request for reproducing multimedia data is received (step S201), the controller 270 detects whether an image is shown in the vertical or the horizontal orientation on the display 208 (step S202). When the image is displayed in the vertical orientation on the display 208, the controller 270 operates the first speaker 210 as a woofer speaker and the second speaker 211 as a main speaker (step S203). When the image is displayed horizontally on the display 208, the controller 270 operates the first speaker 210 as the main speaker and the second speaker 211 as the woofer speaker (step S204).

When the second speaker 211 and the third speaker (not shown) are mounted at opposing end portions of the display 208, as mentioned above, the controller 270 can output surround sound through the second and third speakers. In addition, a base sound can be output through the first speaker 210.

The speaker control methods according to the present invention can be implemented by software, hardware, or their combination. For example, the speaker control methods can be stored in a storage medium (e.g., an internal memory of the mobile terminal, a flash memory, a hard disk, etc.), and can be implemented with codes or command languages in a software program that can be executed by a processor (e.g., an internal microprocessor of the mobile terminal).

As described, the mobile terminal according to the present invention has the following advantages.

By forming a first sound emission hole at one end in the vertical direction of the second body and a second sound emission hole at one end in the horizontal direction of the second body, sounds generated from a first speaker can be emitted through the first sound emission hole when the second body is vertically positioned, and sounds generated from the second speaker can be emitted through the second sound emission hole when the second body is horizontally positioned. Therefore, the communication mode can be implemented regardless of the position of the second body, improving user convenience.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile terminal having speaker control, the mobile terminal comprising:
a first body comprising a first key input unit and a second key input unit;
a second body swingably connected to the first body comprising a display unit positioned in vertical direction in a closed state or a horizontal direction in an open state;
a first sound emission hole that is defined within at an upper end of the display unit;
a second sound emission hole that is defined within a side of the display unit;

a first speaker that is defined within a rear side of the first sound emission hole;
a second speaker that is defined within a corner of the display unit; and
a sound guiding part that is defined within the second body configured to guide sound generated from the second speaker to the second sound emission hole.

2. The mobile terminal of claim 1, wherein the first speaker is operated when the display unit is in the closed state, and
wherein the second speaker is operated when the display unit is in the open state.

3. The mobile terminal of claim 1, wherein the sound guiding part comprises:
a sound path formed at an inner surface of the second body; and
a sealing member hermetically sealing the sound path to prevent leakage of sound passing through the sound path.

4. The mobile terminal of claim 3, wherein the sound path is formed at an edge of the inner surface of an upper case of the second body.

5. The mobile terminal of claim 4, wherein the sound path comprises a display support rib for supporting the display unit, and
wherein a space is formed between the support rib and a separation wall extending from the edge of the upper case of the second body.

6. The mobile terminal of claim 1, wherein the second body further comprises a mounting part configured to mount the second speaker on the corner portion.

7. The mobile terminal of claim 1, wherein the sound guiding part is formed from a first rib protruding from an inner surface of an upper case of the second body and a second rib protruding from an inner surface of a lower case of the second body.

8. The mobile terminal of claim 1, wherein an entire bottom surface of the second body is in parallel contact with an upper surface of the first body when in the closed state, and
wherein a portion of the bottom surface of the second body is in perpendicular contact with the upper surface of the first body when in the open state.

9. The mobile terminal of claim 1, wherein the second sound emission hole is that is defined in a position perpendicular to the first sound emission hole.

10. A mobile terminal having speaker control, the mobile comprising:
a display unit configured to display an image in a vertical orientation or a horizontal orientation;
a first speaker unit mounted on an upper end portion of the display unit;
a second speaker unit mounted on at least one side of the display unit; and
a controller configured to output a main sound via the first speaker unit when the image is displayed in the vertical orientation, and to output a base sound via the second speaker unit when the image is displayed in the horizontal orientation.

11. The mobile terminal of claim 10, wherein the second speaker unit comprises at least two speakers mounted at opposing sides of the display unit.

12. The mobile terminal of claim 11, wherein the controller outputs surround sound via the at least two speakers when the image is displayed in the horizontal orientation on the display unit.

13. The mobile terminal of claim 10, wherein the controller outputs surround sound via the first speaker unit and second speaker unit when reproduction of multimedia data is requested.

14. A speaker control method in a mobile terminal, the method comprising:
detecting whether an image is displayed in a horizontal orientation or a vertical orientation on a display unit;
outputting sound via a first speaker when a call connection is attempted upon detecting that an image is displayed in the vertical orientation on the display unit;
outputting the sound via a second speaker when a call connection is attempted upon detecting that an image is displayed in the horizontal orientation on the display unit; and
outputting a main sound via the first speaker and a base sound via the second speaker when the image is displayed in the horizontal orientation and reproduction of multimedia data is requested.

15. The method of claim 14, further comprising outputting sound via the first speaker and the second speaker when reproduction of the multimedia data is requested and the multimedia data is displayed the vertical orientation on the display unit.

16. A mobile terminal comprising a speaker control unit; the mobile terminal comprising:
a first body comprising a first key input unit and a second key input unit;
a second body operatively coupled to the first body and comprising a display unit, the second body configured to move to a closed state to cover the second key input unit and an open state to expose the second key input unit;
a first sound emission hole that is defined within an upper end of the display unit;
a second sound emission hole that is defined within a side of the display unit;
a speaker defined in a position behind the first sound emission hole; and
a sound guiding part that is defined within the second body configured to guide sound generated from the speaker to the second sound emission hole.

17. The mobile terminal of claim 16, wherein the second sound emission hole is that is defined in a position as perpendicular to the first sound emission hole.

* * * * *